(12) United States Patent
Van Den Berg

(10) Patent No.: US 8,694,191 B2
(45) Date of Patent: Apr. 8, 2014

(54) UNMANNED AUTONOMOUS VEHICLE FOR DISPLACING FEED

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 887 days.

(21) Appl. No.: 12/297,686

(22) PCT Filed: Mar. 23, 2007

(86) PCT No.: PCT/NL2007/000083
§ 371 (c)(1),
(2), (4) Date: Oct. 20, 2008

(87) PCT Pub. No.: WO2007/120036
PCT Pub. Date: Oct. 25, 2007

(65) Prior Publication Data

US 2009/0069968 A1    Mar. 12, 2009

(30) Foreign Application Priority Data

Apr. 18, 2006  (NL) ...................................... 1031605

(51) Int. Cl.
*G06F 17/00* (2006.01)
*G06F 19/00* (2011.01)
*B62D 6/04* (2006.01)
*G01C 21/00* (2006.01)

(52) U.S. Cl.
USPC ................. 701/23; 701/41; 701/50; 701/466; 180/6.2; 180/167

(58) Field of Classification Search
USPC ............. 701/1, 22, 23, 36, 41, 48, 49, 50, 69, 701/70, 82, 93, 96, 124, 400, 408, 466, 300, 701/301, 302; 318/3, 5, 580; 180/6.2, 167
See application file for complete search history.

(56) References Cited

U.S. PATENT DOCUMENTS 2,966,256 A   12/1960  McLeland
3,273,038 A    9/1966  Miller (Continued)

FOREIGN PATENT DOCUMENTS

AT         6016 A      3/2003
DE      1109441 A      6/1961

(Continued)

OTHER PUBLICATIONS

International Search Report and Written Opinion.

*Primary Examiner* — Thomas Tarcza
*Assistant Examiner* — Edward Pipala
(74) *Attorney, Agent, or Firm* — Hoyng Monegier LLP; Coraline J. Haitjema; David P. Owen

(57) ABSTRACT

An unmanned autonomous vehicle for displacing feed lying on a floor is provided with two wheels that are separately drivable, a distance determining device for determining the distance from the vehicle to a wall portion, an orientation determining device for determining the orientation of the center line of the vehicle relative to the wall portion, a torque difference determining device for determining the torque difference between the wheels, a control unit for controlling the vehicle and moving it in a direction of travel, and a feed displacing arrangement for displacing feed substantially sidewardly. The control unit may be programmed in such a way that during operation the vehicle will maintain a distance determined by the distance determining device to the wall portion, which distance is greater than or equal to a pre-adjusted minimum distance to the wall portion. During operation the center line of the vehicle may be maintained with an orientation determined by the orientation determining device relative to the wall portion, which orientation is at least almost equal to a pre-adjusted orientation. During operation the drivable wheels of the vehicle may show a torque difference determined by the torque difference determining device, which difference can then be maintained at a value smaller than or equal to a pre-adjusted maximum torque.

21 Claims, 2 Drawing Sheets

(56) References Cited

U.S. PATENT DOCUMENTS

| | | | |
|---|---|---|---|
| 4,119,900 A | 10/1978 | Kremnitz | |
| 5,109,566 A | 5/1992 | Kobayashi | |
| 5,309,592 A | 5/1994 | Hiratsuka | |
| 5,341,540 A | 8/1994 | Soupert | |
| 5,646,494 A | 7/1997 | Han | |
| 5,951,782 A | 9/1999 | Truitt | |
| 6,038,501 A | 3/2000 | Kawakami | |
| 2002/0130207 A1* | 9/2002 | van den Berg | 239/654 |
| 2003/0020243 A1* | 1/2003 | Van den Berg | 280/1 |
| 2006/0180089 A1* | 8/2006 | Van Den Berg | 119/60 |

FOREIGN PATENT DOCUMENTS

| | | |
|---|---|---|
| DE | 1183301 A | 12/1964 |
| DE | 4425924 A | 1/1996 |
| DE | 4444508 C1 | 2/1996 |
| DE | 29800152 U1 | 5/1998 |
| EP | 0142594 B1 | 6/1989 |
| EP | 0382693 B1 | 10/1994 |
| EP | 0943235 A2 | 9/1999 |
| EP | 1369010 B1 | 10/2003 |
| EP | 1369017 A1 | 10/2003 |
| EP | 1584230 A | 10/2005 |
| EP | 1779722 A1 | 5/2007 |
| EP | 1369012 B1 | 4/2008 |
| FR | 2862489 A1 | 5/2005 |
| GB | 2313190 A | 11/1997 |
| GB | 2313191 A | 11/1997 |
| NL | 7416427 A | 6/1975 |
| WO | 9603259 A1 | 2/1996 |
| WO | 0070935 A | 11/2000 |
| WO | 0070936 A | 11/2000 |

* cited by examiner

UNMANNED AUTONOMOUS VEHICLE FOR DISPLACING FEED

CROSS REFERENCE TO RELATED APPLICATIONS

This application is a continuation of International Application No. PCT/NL2007/000083 which was published under PCT Article 21(2) in English, the contents of which are hereby incorporated by reference in their entirety.

BACKGROUND OF THE INVENTION

1. Field of the Invention

The invention relates to unmanned autonomous vehicles for displacing feed lying on a floor e.g. in a stable or stall, in particular to such vehicles having feed displacing arrangements for displacing feed substantially sideward towards a feed gate or the like.

2. Description of the Related Art

Unmanned vehicles are generally known. For example, an unmanned vehicle for cleaning a stable floor is described in EP-A-0 943 235. Furthermore, Austrian utility model AT-6016-U discloses a device that is movable along a guide rail for displacing feed substantially transverse to the direction of travel.

BRIEF SUMMARY OF THE INVENTION

The present invention provides an unmanned autonomous vehicle that is capable of displacing feed substantially transverse to the direction of travel.

According to the present invention, this object is achieved by means of an unmanned autonomous vehicle for substantially sidewardly displacing feed lying on a floor, which vehicle is provided with two wheels that are separately drivable by separate drive means, a distance determining device for determining the distance from the vehicle to a wall portion, a torque difference adjusting device for adjusting the torque difference between the wheels, a control unit for controlling the vehicle and moving it in a direction of travel, and a feed displacing arrangement for displacing feed substantially sidewards, the control unit being programmed in such a way that during operation the vehicle will maintain a distance determined by the distance determining device to the wall portion, which distance is greater than or equal to a pre-adjusted minimum distance to the wall portion. Precisely this arrangement and the control unit programmed in this manner ensure that the unmanned autonomous vehicle, when displacing the feed at least substantially sidewardly, is correctly positioned and correctly propelled, despite an (unpredicted) reaction force being exerted on the unmanned vehicle by the feed.

In an embodiment of an unmanned vehicle according to the invention, the torque difference adjusting device is provided with a torque difference determining device for determining the torque difference between the wheels. In this case, it is in particular preferred if the control unit is programmed in such a way that during operation the drivable wheels of the vehicle will show a torque difference determined by the torque difference determining device, which distance is smaller than or equal to a pre-adjusted maximum torque. Controlling the unmanned vehicle on the basis of the torque difference ensures that the unmanned vehicle will always displace an at least almost equal amount of feed substantially sidewardly, because the torque difference is precisely caused by and is proportional to the force that is needed for displacing an amount of feed.

An particularly accurate sideward displacement of feed can be achieved if the unmanned vehicle is provided with an orientation determining device for determining the orientation of the centre line of the vehicle relative to the wall portion, the control unit being programmed in such a way that during operation the centre line of the vehicle will maintain an orientation determined by the orientation determining device relative to the wall portion, which orientation is at least almost equal to a pre-adjusted orientation.

In an embodiment of un unmanned vehicle according to the present invention, the control unit is programmed in such a way that for controlling the vehicle priority is given to the distance determined by the distance determining means in combination with the pre-adjusted minimum distance. This prevents the unmanned vehicle from coming too close to the wall portion in the case of little feed lying on the floor. In particular in the case of the wall portion being a feeding gate where animals, such as cows for example, are present, a too close approach to the animals might lead to un undesirably great unrest with the animals. Moreover, a too small distance to the wall portion might lead to un undesirable accumulation of the feed.

In a preferred embodiment of an unmanned vehicle according to the invention, the pre-adjustable distance is adjustable during operation. The adjustment may, for example, depend on the point of time of the day, the period of time elapsed since the unmanned vehicle was present at the same position, the sort of animals or the individual animals present at the wall portion, for example a feeding gate. In a preferred embodiment of an unmanned vehicle according to the present invention, the pre-adjusted maximum torque difference and/or the pre-adjusted orientation are/is also adjustable during operation.

If the feed displacing means comprise a freely rotatable circular element whose outer circumference constitutes the outer circumference of the vehicle, no separate drive for the feed displacing means is needed, since the freely rotatable circular element is driven by the feed itself (substantially by friction engagement). If desired, the outer surface of the circular element may be provided with one or more friction increasing layers and/or elements. For obtaining a reliable, substantially sideward displacement of the feed, an embodiment of an unmanned vehicle according to the invention is wherein the circular element is tilted in such a way that, at least almost in the direction of travel of the vehicle, it is located closest to the floor. If the angle enclosed by the circular element and the floor is adjustable, the unmanned vehicle is capable of being adjusted so as to displace different sorts of feed in a correct manner at least almost substantially transverse to the direction of travel of the vehicle.

The distance determining device preferably comprises an ultrasonic sensor. Furthermore, it is advantageous if the unmanned vehicle is provided with a device for detecting skid of at least one of the drivable wheels.

If the unmanned vehicle is provided with an open bottom, material, such as feed, is prevented from accumulating in the interior of the vehicle and possibly adversely affecting there the operation of the unmanned vehicle. According to an embodiment of an unmanned vehicle according to the invention, feed can be supplied if the unmanned vehicle is provided with a storage container for containing feed, and with a discharge device for discharging feed to the floor. The storage container is preferably provided with a mixing device for mixing feed. In this case it is advantageous if the control unit controls the operation of the discharge device on the basis of data from the distance determining device and/or the torque difference determining device and/or the speed of the vehicle and/or the weight decrease of the storage container. Alternatively or additionally, the unmanned vehicle may be provided with a signalling device for supplying a signal (for example for drawing the attention of an owner and/or operator of the unmanned vehicle), the control unit controlling the operation of the signalling device on the basis of data from the distance determining device and/or the torque difference determining device.

According to another aspect of the invention, there is also provided an unmanned autonomous vehicle for displacing feed lying on a floor, which vehicle is provided with: a drive arrangement for moving the vehicle in a direction of travel; a position determining device for at least partially determining a relative position of the vehicle; a feed displacing arrangement for displacing feed, the feed displacing arrangement comprising a freely rotatable circular element whose outer circumference constitutes an outer circumference of the vehicle; and a control unit for controlling the vehicle.

BRIEF DESCRIPTION OF THE DRAWINGS

The features and advantages of the invention will be appreciated upon reference to the following drawings, in which.

DESCRIPTION OF ILLUSTRATIVE EMBODIMENTS

The following is a description of certain embodiments of the invention, given by way of example only and with reference to the drawings.

Figure 1:
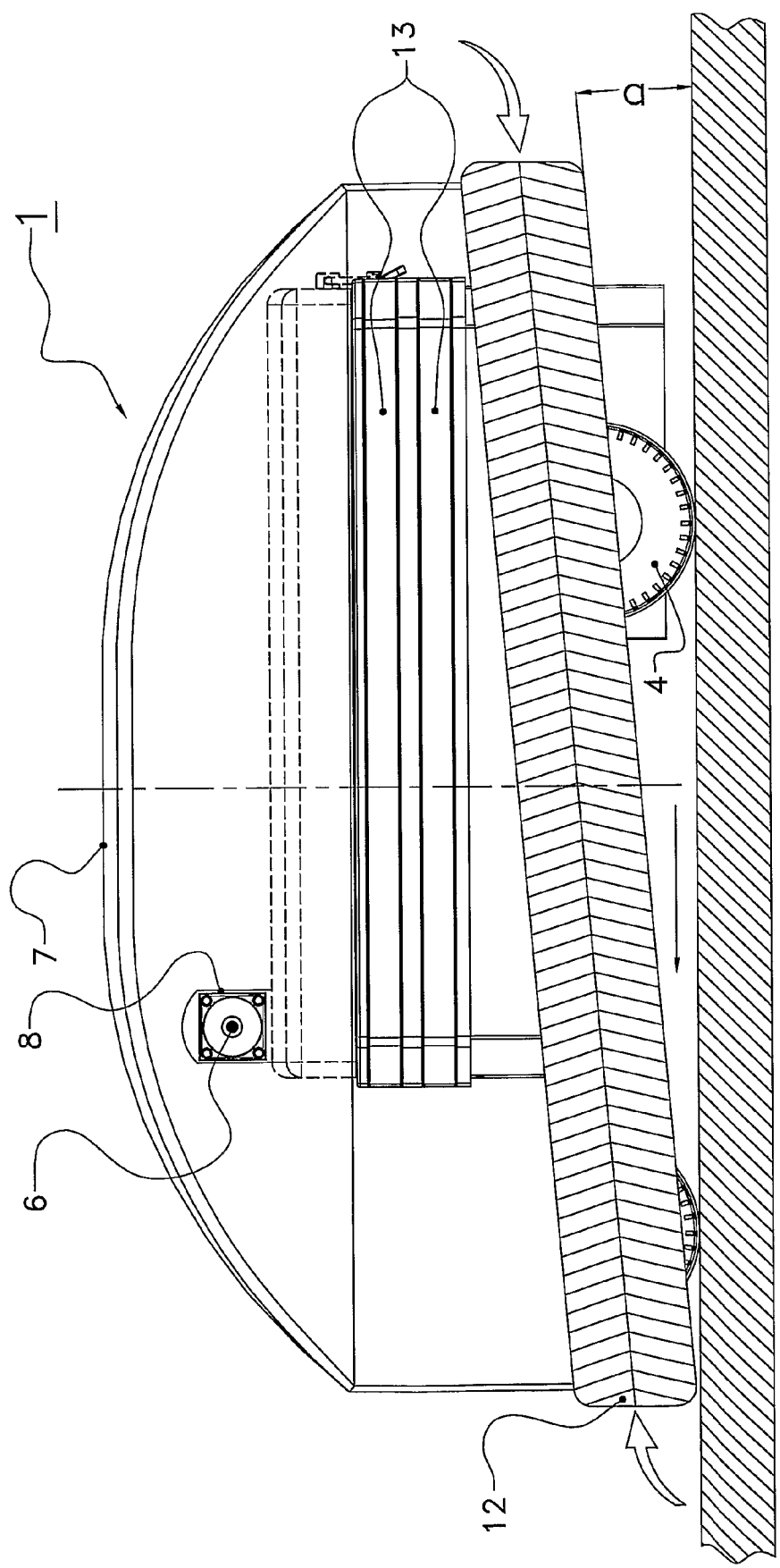
FIG. 1 is a schematic side view of the unmanned vehicle according to the invention.
Figure 2:
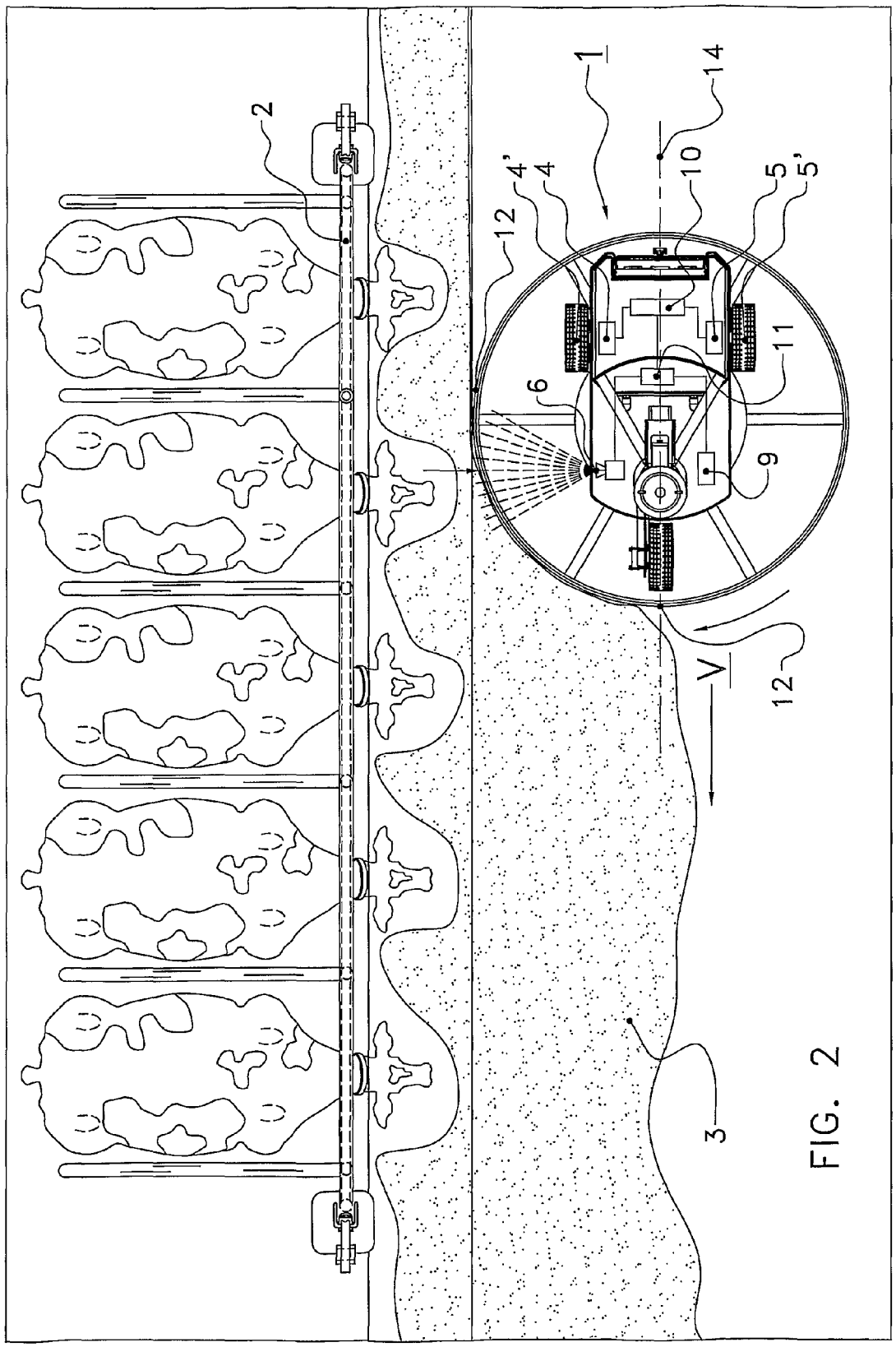
FIG. 2 is a schematic plan view of the unmanned vehicle according to the invention to be used for displacing feed to a feeding gate.

FIGS. 1 and 2 show an unmanned autonomous vehicle 1 for displacing feed 3 lying on a floor substantially sidewards to a feeding gate 2. The feed 3, that may be solid, liquid or a mixture thereof, has been deposited at the feeding gate 2 in a manner known per se, for example with the aid of a tractor. It will be obvious that the present invention will also be applicable to other installations for supplying feed to animals, so that the feeding gate shown in FIG. 2 is only one of the many examples of a wall portion in the vicinity of which feed can be deposited. In the present invention, by the term "wall portion" all embodiments of partition elements are meant, either or not having an open structure, it being possible for the wall portion to assume many different, curved, rectilinear, angular, etc. shapes.

Autonomously movable vehicles for performing many different functions, as well as the control of such vehicles, are known per se and will therefore not be described here in detail. Automatic charging of the energy supply of the vehicle and automatic loading and unloading of other materials into and from, respectively, containers present on the vehicle, are known as well. It will suffice to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. No. 5,341,540, U.S. Pat. No. 5,646,494, EP-0943235, EP-1369010, EP-1369012 and EP-1369017, the contents of all of which are hereby incorporated by reference in their entirety.

The unmanned vehicle 1 comprises two wheels 4', 5' that are separately drivable by separate drive means 4, 5. The unmanned vehicle 1 is further provided with a distance determining device 6, in the embodiment shown an ultrasonic sensor, for determining the distance from the vehicle 1 to the feeding gate 2. It will be obvious that all sensors known in the technique, such as for example the sensors mentioned in the patent documents enumerated above, can be used for the purpose of distance determination. The unmanned vehicle 1 can be provided with an external, protective covering 7 provided with apertures 8, so that the ultrasonic sensor 6 is enabled to detect the feeding gate 2. In order to prevent material, such as feed and the like, from accumulating in the interior of the unmanned vehicle 1 via the apertures 8, the bottom of the unmanned vehicle 1 is at least partially open.

The unmanned vehicle 1 further comprises an orientation determining device 9, in the embodiment shown a gyroscope, for determining the orientation of the centre line 14 of the vehicle 1 relative to the feeding gate 2. It will be obvious that all sensors known in the technique, such as for example the sensors mentioned in the patent documents enumerated above, can be used for the purpose of orientation determination, such as an electronic compass or a camera with image recognition equipment.

The unmanned vehicle 1 is also provided with a torque difference determining device 10 for determining the torque difference between the wheels 4', 5'. Such a torque difference determining device, which uses data from the drive means 4, 5, is known per se. Such a torque difference determining device can also be used for detecting skid of one of the wheels, after which detection it is possible to perform a correct action (reducing the number of revolutions per minute, alarming an operator).

The unmanned vehicle 1 is further provided with a control unit 11 for controlling the unmanned vehicle 1 and moving it in a direction of travel, which control unit 11 is connected, via electric wires, or in a wireless manner if desired, with the distance determining device 6, the orientation determining device 9, the torque difference determining device 10, and the drives 4, 5 of the wheels 4', 5', for the purpose of exchanging data.

For displacing feed 3 substantially transverse to the direction of travel V of the unmanned vehicle, the unmanned vehicle 1 is provided with feed displacing means 12. Such feed displacing means can be constituted by an obliquely disposed slide, or by a conveyor belt. However, according to an embodiment of the invention, these feed displacing means 12 are preferably constituted by a freely rotatable circular element 12, whose outer circumference constitutes the outer circumference of the unmanned vehicle 1. When, during operation of the unmanned vehicle 1, the circular element 12, which may be for example a ring or a disc, comes into contact with the feed, said element 12 is rotated automatically, in other words the circular element 12 is feed driven. An extremely reproducible displacement of the feed is obtained if the circular element 12 is tilted through an angle α in such a way that, at least almost in the direction of travel V of the vehicle 1, it is located closest to the floor. In dependence on the feed to be displaced, the angle α enclosed by the circular element 12 and the floor, can be adjustable. If desired, the angle α is adjustable, during operation of the vehicle 1, by tilting means known per se (not shown in the drawing), such as a cylinder, that are controlled by the control unit 11.

When the feed is deposited on the floor, and when the animals present at the feeding gate are eating the feed, the feed is accumulated over different distances to the feeding gate to different heights. In order that the animals are always able to reach in a simple manner a desired amount of feed it is ensured, by making the unmanned vehicle move regularly along the feeding gate 2, that feed is displaced to the feeding gate, as schematically shown in FIG. 2. In order that the unmanned vehicle 1 is correctly controlled, the control unit 11 is programmed in such a way that during operation the vehicle 1 will maintain a distance determined by the distance determining device 6 to the feeding gate 2, which distance is greater than or equal to a pre-adjusted minimum distance to the feeding gate, and that during operation the centre line 14 of the vehicle will maintain an orientation determined by the orientation determining device 9 relative to the feeding gate 2, which orientation is at least almost equal to a pre-adjusted orientation, and that during operation the drivable wheels 4', 5' of the unmanned vehicle 1 will show a torque difference determined by the torque difference determining device 10, which torque difference is smaller than or equal to a pre-adjusted maximum torque. This means that the unmanned vehicle 1 will always maintain a correct orientation relative to the feeding gate 2, that the unmanned vehicle 1 will not come within the minimum distance to the feeding gate 2, and that it is ensured that the feed will not accumulate too much, because, in case of the unmanned vehicle 1 moving through a too large amount of feed, the torque difference would become too great.

The control unit 11 is programmed in such a way that, for controlling the unmanned vehicle 1, priority is given to the distance determined by the distance determining means 6 in combination with the pre-adjusted minimum distance.

In a preferred embodiment of an unmanned vehicle 1, the pre-adjustable distance is adjustable during operation. The adjustment may, for example, depend on the point of time of the day, the period of time elapsed since the unmanned vehicle was present at the same position, the sort of animals or the individual animals present at the feeding gate. In a preferred embodiment of an unmanned vehicle, also the pre-adjusted maximum torque difference and/or the pre-adjusted orientation are/is adjustable during operation.

The unmanned autonomous vehicle 1 is provided with a (non-shown) energy supply that is chargeable via sidewardly disposed charging strips 13 that are capable of being brought into contact with a charging device. Other ways of charging the energy supply, such as inductive means, are mentioned inter alia in the above-mentioned patent documents.

Although not shown in the figures, the unmanned vehicle 1 may additionally be adapted to supply feed. For this purpose, the unmanned vehicle 1 may be provided with a storage container for containing feed, and with a discharge device for discharging feed to the floor. The storage container is preferably provided with a mixing device for mixing feed. In this case it is advantageous if the control unit controls the operation of the discharge device on the basis of data from the distance determining device and/or the torque difference determining device and/or the speed of the vehicle and/or the weight decrease of the storage container. This enables inter alia the supply of a uniform amount of feed. When, for example, at a particular distance to the feeding gate the torque difference comes below a particular value (for example mentioned in a table stored in a memory of the control unit), the amount of feed has come below a particular value. On the basis of these data, the discharge device can deposit a particular amount of feed on that place of the floor. Alternatively or additionally, the unmanned vehicle 1 may be provided with a signalling device (for example a transmitting aerial with a suitable controlling transmission circuit) for supplying a signal (for example for drawing the attention of an owner and/or operator of the unmanned vehicle), the control unit controlling the operation of the signalling device on the basis of data from the distance determining device and/or the torque difference determining device. The invention is based on the insight that the magnitude of the torque difference depends on the amount of feed present on the floor through which the unmanned vehicle moves, and this torque difference can thus be used advantageously together with the determined distance and orientation for a correct control of the unmanned vehicle.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An unmanned autonomous vehicle for substantially sidewardly displacing feed lying on a floor, which vehicle is provided with:
    two wheels that are separately drivable by separate drives;
    a distance determining device for determining a distance from the vehicle to a wall portion;
    a torque difference adjusting device for adjusting the torque difference between the wheels;
    a feed displacing arrangement for substantially sidewardly displacing feed, the feed displacing arrangement comprising a ring or disk rotatable about a substantially vertical axis for contacting the feed for displacing the feed sideways; and
    a control unit for controlling the vehicle and moving it in a direction of travel by controlling at least one separate drive, the control unit being programmed to maintain a distance determined by the distance determining device to the wall portion, which distance is greater than or equal to a pre-adjusted minimum distance to the wall portion.

2. The unmanned vehicle as claimed in claim 1, wherein the torque difference adjusting device is provided with a torque difference determining device for determining the torque difference between the wheels.

3. The unmanned autonomous vehicle as claimed in claim 2, wherein the control unit is programmed in such a way that for controlling the vehicle, priority is given to the distance determined by the distance determining device in combination with the pre-adjusted minimum distance.

4. The unmanned vehicle as claimed in claim 2, wherein the control unit is programmed in such a way that during operation the drivable wheels of the vehicle will show a torque difference determined by the torque difference determining device, which difference is smaller than or equal to a pre-adjusted maximum torque.

5. The unmanned autonomous vehicle as claimed in claim 4, wherein the pre-adjusted maximum torque difference is adjustable during operation.

6. The unmanned autonomous vehicle as claimed in claim 5, wherein the circular element is tilted in such a way that, at least substantially in the direction of travel of the vehicle, it is located closest to the floor.

7. The unmanned vehicle as claimed in claim 1, wherein the unmanned vehicle is provided with an orientation determining device for determining the orientation of the center line of the vehicle relative to the wall portion, the control unit being programmed in such a way that during operation the center line of the vehicle will maintain an orientation determined by the orientation determining device relative to the wall portion, which orientation is at least almost equal to a pre-adjusted orientation.

8. The unmanned autonomous vehicle as claimed in claim 7, wherein the pre-adjusted orientation is adjustable during operation.

9. The unmanned autonomous vehicle as claimed in claim 1, wherein the pre-adjustable distance is adjustable during operation.

10. The unmanned autonomous vehicle as claimed in claim 1, wherein the feed displacing arrangement comprise a freely rotatable circular element whose outer circumference constitutes the outer circumference of the vehicle.

11. The unmanned autonomous vehicle as claimed in claim 10, wherein the angle enclosed by the circular element and the floor is adjustable.

12. The unmanned autonomous vehicle as claimed in claim 1, wherein the distance determining device comprises an ultrasonic sensor.

13. The unmanned autonomous vehicle as claimed in claim 1, wherein the unmanned vehicle is provided with a device for detecting skid of at least one of the drivable wheels.

14. The unmanned autonomous vehicle as claimed in claim 1, wherein the unmanned vehicle is provided with a chargeable energy supply.

15. The unmanned autonomous vehicle as claimed in claim 1, wherein the unmanned vehicle is provided with an open bottom.

16. The unmanned autonomous vehicle as claimed in claim 1, wherein the unmanned vehicle is provided with a storage container for containing feed, and with a discharge device for discharging feed to the floor.

17. The unmanned autonomous vehicle as claimed in claim 16, wherein the storage container is provided with a mixing device for mixing feed.

18. The unmanned autonomous vehicle as claimed in claim 16, wherein the control unit controls the operation of the discharge device on the basis of data from the distance determining device or the torque difference determining device or the speed of the vehicle or the weight decrease of the storage container.

19. The unmanned autonomous vehicle as claimed in claim 1, wherein the unmanned vehicle is provided with a signalling device for supplying a signal, the control unit controlling the operation of the signalling device on the basis of data from the distance determining device or the torque difference determining device.

20. An unmanned autonomous vehicle for displacing feed lying on a floor, which vehicle is provided with:
 a drive arrangement for moving the vehicle in a direction of travel wherein the drive arrangement controls a drive of at least one wheel;
 a position determining device for at least partially determining a relative position of the vehicle;
 a feed displacing arrangement for displacing feed, the feed displacing arrangement comprising a circular element comprising a ring or disk rotatable about a substantially vertical axis for contacting the feed whose outer circumference constitutes an outer circumference of the vehicle; and
 a control unit for controlling the vehicle.

21. A method for controlling an unmanned autonomous vehicle for displacing feed lying on a floor via a control unit, comprising:
 determining a distance from the vehicle to a wall portion;
 controlling the vehicle via the control unit and moving it in a direction of travel by controlling a drive of at least one wheel of the vehicle, and maintaining a pre-adjusted distance to the wall portion; and
 displacing the feed sideways by contacting the feed with a circular element comprising a ring or disk rotatable about a substantially vertical axis around an outer circumference of the vehicle.

* * * * *